United States Patent
Aries

[11] 3,783,770
[45] Jan. 8, 1974

[54] STIRRER DEVICES FOR CULINARY PURPOSES

[76] Inventor: Graham John Aries, 30 Worcester Ln., Pedmore, Stourbridge, England

[22] Filed: Oct. 15, 1971

[21] Appl. No.: 189,643

[30] Foreign Application Priority Data
Oct. 20, 1970  Great Britain .................. 49,774/70

[52] U.S. Cl. .................................. 99/348, 259/108
[51] Int. Cl..... A47j 43/044, A47j 43/07, B01f 7/16
[58] Field of Search....................... 99/348, 287, 352, 99/353, 354, 355, 356, 364, 371, 388, 395, 409, 443; 259/40–41, 42–43, 44, 107, 108, 122, DIG. 38; 416/122, 131, 228–236

[56] References Cited
UNITED STATES PATENTS

| | | | |
|---|---|---|---|
| 1,304,508 | 5/1919 | Petro | 99/348 UX |
| 1,642,531 | 9/1927 | Barnard | 99/348 UX |
| 2,396,924 | 3/1946 | Monath | 99/348 X |
| 2,513,254 | 6/1950 | Savage et al. | 99/348 X |
| 3,100,628 | 8/1963 | Norris | 259/107 |
| 3,112,917 | 12/1963 | Woerner | 99/348 X |
| 3,357,685 | 12/1967 | Stephens | 99/348 X |
| 3,635,147 | 1/1972 | Lee | 99/348 |
| 314,322 | 3/1885 | Fisk | 416/236 |
| 1,198,529 | 9/1916 | Dowling | 259/107 UX |
| 1,279,515 | 9/1918 | Coleman | 259/DIG. 38 |
| 1,409,112 | 3/1922 | Jones | 259/107 |
| 1,835,284 | 12/1931 | Crowhurst | 416/131 X |
| 2,641,412 | 6/1953 | Byberg | 259/107 X |
| 2,699,925 | 1/1955 | Madl | 416/122 |
| 2,692,125 | 10/1954 | Light | 259/122 X |
| 2,805,843 | 9/1957 | Block | 259/108 |
| 3,009,686 | 11/1961 | Kaplan | 259/108 X |
| 3,251,581 | 5/1966 | Jensen | 259/108 |

Primary Examiner—William I. Price
Assistant Examiner—Arthur O. Henderson
Attorney—Young and Thompson

[57] ABSTRACT

A cooking vessel or a lid therefor is described, having a shaft journalled for rotation by drive means and one or more wiper arms connected to the lower end of the shaft and positioned so as to wipe the major portion of the upper surface of the base of the cooking vessel as the shaft is rotated.

6 Claims, 6 Drawing Figures

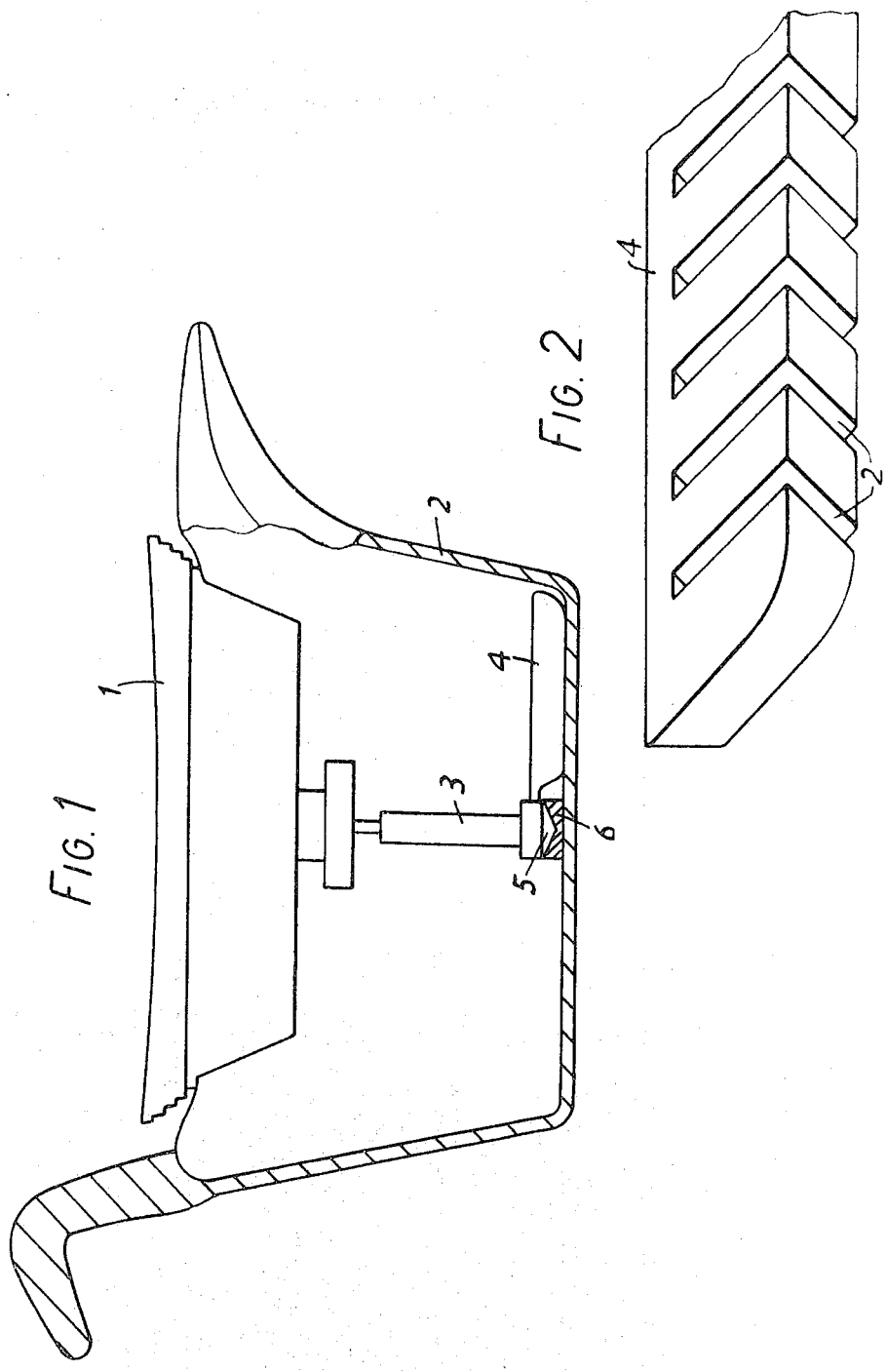

STIRRER DEVICES FOR CULINARY PURPOSES

FIELD AND SUMMARY OF THE INVENTION:

This invention relates to stirrer devices for culinary purposes and more particularly relates to cooking vessels and lids therefor provided with stirrer devices.

A problem arising during the preparation of viscous types of food, for example, sauces, gravies and custards, is that the contents of the vessel in contact with the base may burn unless the contents are continuously or periodically stirred so that the contact time of a particular portion of the contents with the base of the vessel is limited. The necessary stirring is a time-consuming operation and can easily be overlooked, especially when other foods are being prepared at the same time, resulting in spoiling of the food.

It is an object of this invention to provide a cooking vessel or a lid therefor equipped with a stirrer device whereby the risk of burning of the contents of the vessel is reduced, so that constant attention is rendered unnecessary.

Although the term "stirrer device" is used herein, it should be noted that the device is not primarily used to effect mixing of the contents of the vessel, but rather its main purpose is to perform a wiping action over the base of the vessel, to ensure that material which comes into contact with the base of the vessel is soon separated from it again.

According to one aspect of the invention, a cooking vessel comprises a base portion having an upper surface which is a surface of revolution, a shaft journalled for rotation about the axis of rotation of the surface of revolution, drive means for causing rotation of the shaft, and one or more wiper arms connected to the lower end of the shaft and positioned so as to wipe the major portion of the upper surface of the base as the shaft is rotated.

According to a second aspect of the invention, a cooking vessel lid has a shaft journalled for rotation therein and extending downwardly therefrom, drive means for causing rotation of the shaft, and one or more wiper arms connected to the lower end of the shaft in such a manner that rotation of the shaft causes the wiper arm or arms to traverse a surface of revolution.

In accordance with a preferred form of the invention, the or each wiper arm or arms is replaceably detachable. Thereby, different length shafts and/or arms can be used with the same lid so that it can be used for a number of different size vessels; the arms can also be readily removed for cleaning. The shaft can also be made telescopically extensible to cater for different depth pans with the same lid and stirrer assembly.

A wiping edge of the or each wiper arm may have a number of slots therein. This reduces friction between the arm and the upper surface of the base. The slots may be inclined to the tangents of circles centred on the shaft axis and passing through the slots whereby the contents of the vessel are radially as well as circumferentially displaced by the movement of the wiper arm(s).

In a preferred embodiment of the invention the drive means is a permanent magnet DC electric motor powered by one or more batteries. The batterie(s) may be rechargeable.

To afford a clearer understanding of the invention, a number of embodiments are described below with reference to the accompanying drawings in which:

FIG. 1 is a sectional view of a cooking vessel incorporating a stirrer device in a lid thereof;

FIG. 2 is a detailed perspective view on an enlarged scale of a wiper arm of the stirrer device shown in FIG. 1;

DETAILED DESCRIPTION OF THE EMBODIMENTS

Figure 3:
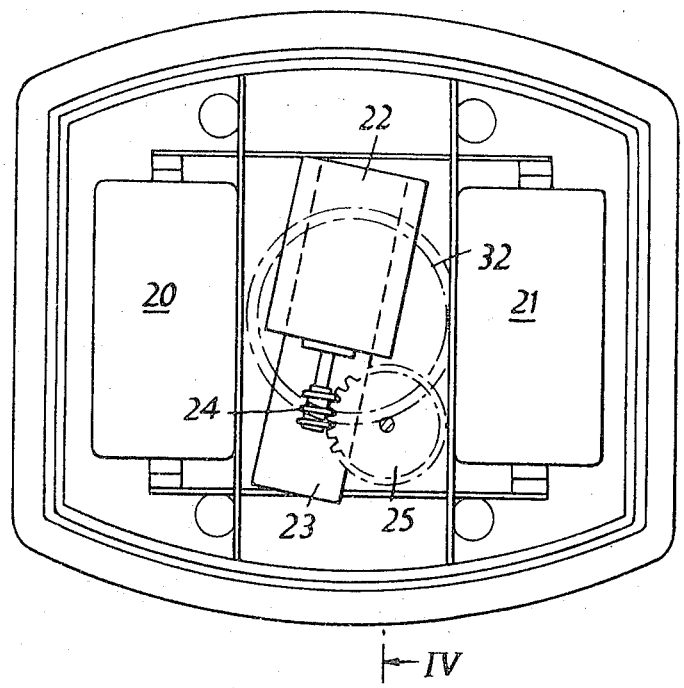
FIG. 3 is a plan view of the lid of the vessel shown in FIG. 1 with some parts removed to show the arrangement of the components of the stirrer device.

Referring to FIG. 1, a lid 1 of a cooking vessel 2 is fitted with a stirrer device including a shaft 3 journalled for rotation in the lid and projecting from the underside thereof. The shaft 3 carries a wiper arm or blade 4 at its lower end. The length of the shaft 3 is such that, with the lid 1 in position on the vessel 2, a pointed lower end portion 5 of the shaft engages with and is journalled in a correspondingly shaped dimple 6 on the base of the vessel 2. The wiper arm or blade 4 bears with the wiping surface or edge thereof in contact with the base.

The wiper arm 4 is preferably made of polypropylene and as shown in FIG. 2 has slots 10 in the wiping edge engaging the base of the cooking vessel. These slots 10 reduce the frictional drag between the arm and the base as the arm rotates and run at an angle to the longitudinal axis of the blade and thus cause a radial displacement of the contents of the vessel, the direction of such displacement depending on the direction in which the slots run relative to the longitudinal axis of and the direction of rotation of the blade. Although only one wiper arm 4 is shown in the drawings, the shaft can be fitted with two or more such arms.

Figure 4:
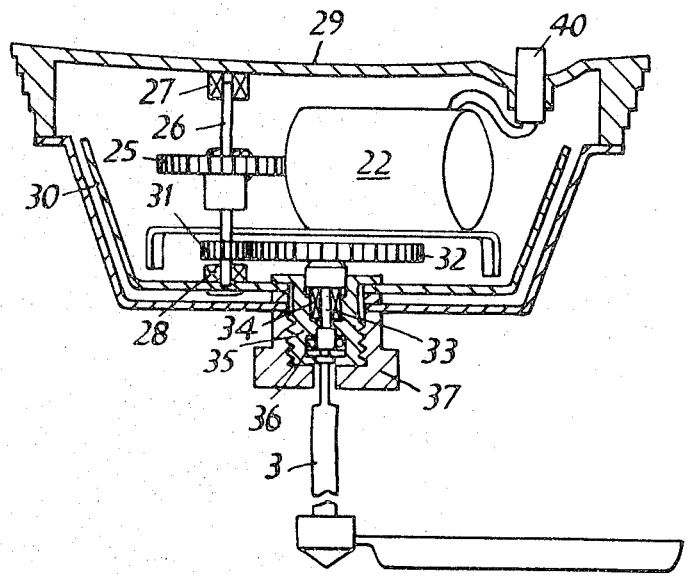
FIG. 4 is a sectional view of the lid taken substantially along the line IV — IV of FIG. 3.

Referring to FIGS. 3 and 4, the components mounted in the lid 1 include a pair of batteries 20, 21 connected in parallel for supplying power to a permanent magnet DC electric motor 22 which is mounted on a bracket 23. A worm gear 24 is mounted on the output shaft of the motor 22 and drives a worm wheel 25 mounted on an idler shaft 26. The shaft 26 is mounted in bearings 27 and 28 provided respectively on a cover 29 and a mounting chassis 30. Rotation of the shaft 26 is transmitted through a reduction gearing consisting of a first spur gear 31 and a second spur gear 32 to a shaft 33 which is mounted in a bearing 34 in a bearing housing 35 and passes through an O-ring seal 36. The free end of the shaft 33 is connected to the shaft 3. The chassis 30 is attached to the cover 29 and the cover, chassis and the components mounted thereon are fixed to the lid by means of a locking ring 37 which is threaded on to the bearing housing 35.

A suitable motor for use in the device requires a 1.5 V DC input and has an output torque of 15 gcm at 5,000 rpm. The preferred speed of the blade is 30 rpm, there being a torque requirement during operation of 2 to 4 oz in. Preferably, the motor, cells and driving components are in a self-contained unit moulded from nylon, polystyrene or phenolic resin, the battery compartments having covers which can be clipped into position.

The lid 1 contains a switch 40 which is shown schematically in FIG. 4 as it may be any simple type of switch. However, for reasons of space saving, a sliding contact switch such as is used in torches or flashlights is preferable.

The device as described above may be used in various vessels such as a sauce-boat, milk pan, soup pan or stew pan. If the lid openings in the vessels are the same in size and shape, then a single lid incorporating the stirrer device may be used with a set of the vessels. However, such vessels may not be the same in size and therefore a blade which is suitable for one vessel may not be entirely suitable for another. It is therefore advantageous if the shaft 3 is removably attached to the shaft 33 so that blades of different dimensions may be used.

Figure 5:
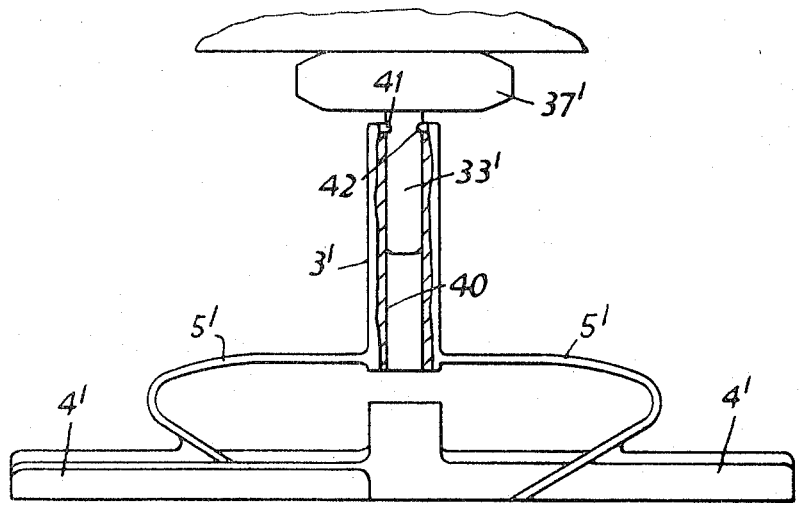
FIG. 5 is a view of the shaft and wiper arms only of another embodiment of the invention in which the shaft is detachable from the lid or vessel.

A modified arrangement in which a shaft 33' attached to a cooking vessel or a lid therefor is detachably connected to a shaft 3' having a pair of wiper arms 4' on its lower end is shown in FIG. 5. The arrangement is similar to the previous embodiment in that a locking ring 37' holds the stirrer drive assembly together. The shaft 3' is provided with a central bore 40 arranged to accommodate the arm 33' as an easy sliding fit. The upper end of the bore 40 is partly closed by a lip 41 which snap-locks into a corresponding recess 42 in the arm 33' and thus detachably secures the shaft 3' and wiper arms 4' to the arm 33'. Such an arrangement allows the different cleaning operations required by the blade and the lid to be separately carried out. The wiper arms 4' are secured to the shaft 3' by way of resilient connections 5' which can be moulded in one piece with the shaft 3' and arms 4'. This construction allows the arms 4' to be located so that they slightly bias the connections 5' when in contact with the pan base and this biasing maintains the arms 4' in wiping contact with the pan base in use.

Figure 6:
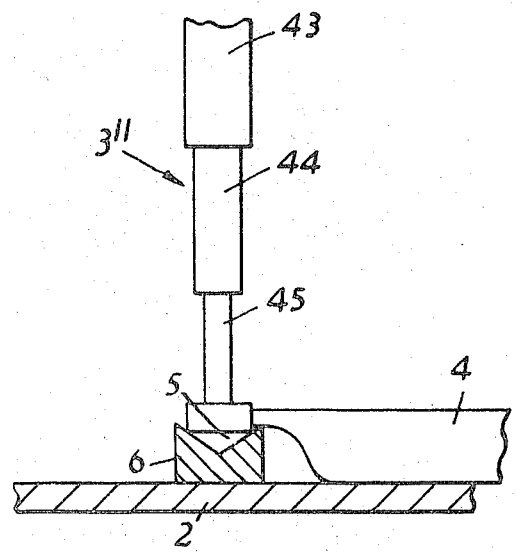
FIG. 6 is a view corresponding to part of FIG. 1 of a third embodiment in which the shaft is telescopic.

To allow the stirrer device to be used for vessels of different depth but similar diameter, the shaft mounting the wiper arm or arms may be telescopic. A modification of the embodiment of FIG. 1 in which the shaft 3'' is formed from three relatively telescopically extensible sections 43, 44 and 45 is shown in FIG. 6.

Preferably, the lid and the opening it fits into are noncircular in plan, as illustrated in FIG. 3. This prohibits any possibility of the lid rather than the food rotating if the food being cooked is very viscous.

The batteries 20, 21 may be expendable dry cells or may be of the re-chargeable type. In the latter case, the necessary battery charger may be incorporated in the vessel or may be separate. The vessel must then be provided with terminals for connection to a mains electricity supply or to a separate charger.

The invention may be embodied in other forms from those specifically described above. For instance, the stirrer device may be fitted into a lid which is hingedly connected to a cooking vessel or it may be fitted to the vessel itself. Also, the drive means, instead of being an electric motor, may be embodied mechanically, e.g. as a clockwork motor.

I claim:
1. A cooking vessel comprising: a body which includes a base portion having an upper surface which is a surface of revolution about a substantially vertical axis of revolution; a lid for said body; a shaft; means journalling said shaft in said lid for rotation about said axis of revolution of said surface of revolution; drive means connected to said shaft for causing rotation thereof; a plurality of wiper arms; and a plurality of resilient connections each attaching a respective one of said wiper arms to the lower end of said shaft so as to bias said wiper arms into wiping contact with said upper surface of said base portion, said arms extending outwardly from said axis and being so positioned as to wipe the major part of said upper surface as said shaft is rotated.

2. A cooking vessel according to claim 1 wherein said upper surface of said base portion is circular and a pair of wiper arms extended radially outwardly from said shaft in respective opposite directions and are joined together at their inner ends, each said resilient connection being a curved member extending generally radially outwardly from said shaft and then doubling back on itself before meeting the associated arm.

3. A hand-portable cooking vessel comprising a body having a flat base portion; said base portion having a flat upper surface; a lid for said body; a shaft; means journalling said shaft in said lid for rotation about a vertical axis located substantially centrally of the center of said upper surface of said base portion; an electric motor; means coupling said electric motor to said shaft for causing rotation of said shaft; at least one battery connected to power said motor; a plurality of wiper arms; and a plurality of resilient connections each attaching a respective one of said wiper arms to the lower end of said shaft so as to bias said wiper arms into wiping contact with said upper surface of said base portion, said arms extending outwardly from said axis and being so positioned as to wipe the major part of said upper surface as said shaft is rotated.

4. A hand-portable cooking vessel according to claim 3 wherein a pair of wiper arms extend radially outwardly from said axis in respective opposite directions and are joined together at their inner ends, each said resilient connection being a curved member extending generally radially outwardly from said shaft and then doubling back on itself before meeting the associated arm.

5. A cooking vessel lid having a shaft journalled for rotation therein and extending substantially vertically downwardly therefrom; drive means connected to said shaft for causing rotation thereof; a plurality of wiper arms; and a plurality of resilient connections each attaching a respective one of said wiper arms to the lower end of said shaft so that said arms extend outwardly of the axis of said shaft and are biassed downwardly.

6. A cooking vessel lid according to claim 5 wherein a pair of wiper arms extend radially outwardly from said shaft in respective opposite directions and are joined together at their inner ends, each said resilient connection being a curved member extending generally radially outwardly from said shaft and then doubling back on itself before meeting the associated arm.

* * * * *